E. T. BUSSELL.
3 Sheets--Sheet 3.
Cultivators.
No. 129,712.
Patented July 23, 1872.
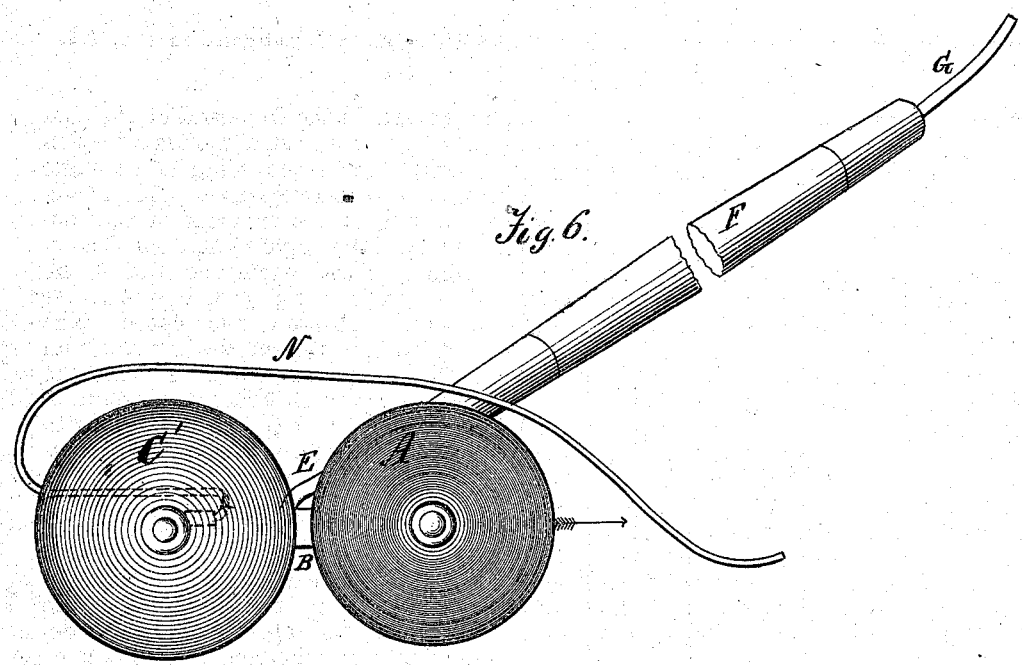
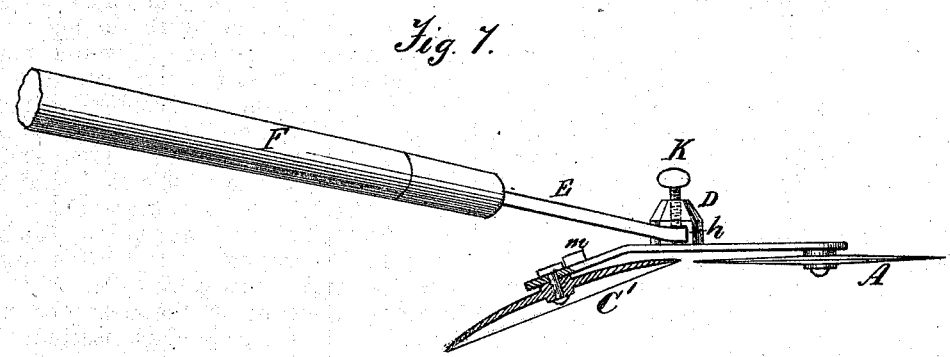
Witnesses.
A. Ruppert
Richard Covington
Inventor:
Erastus T. Bussell
By Theodore Munger,
Attorney

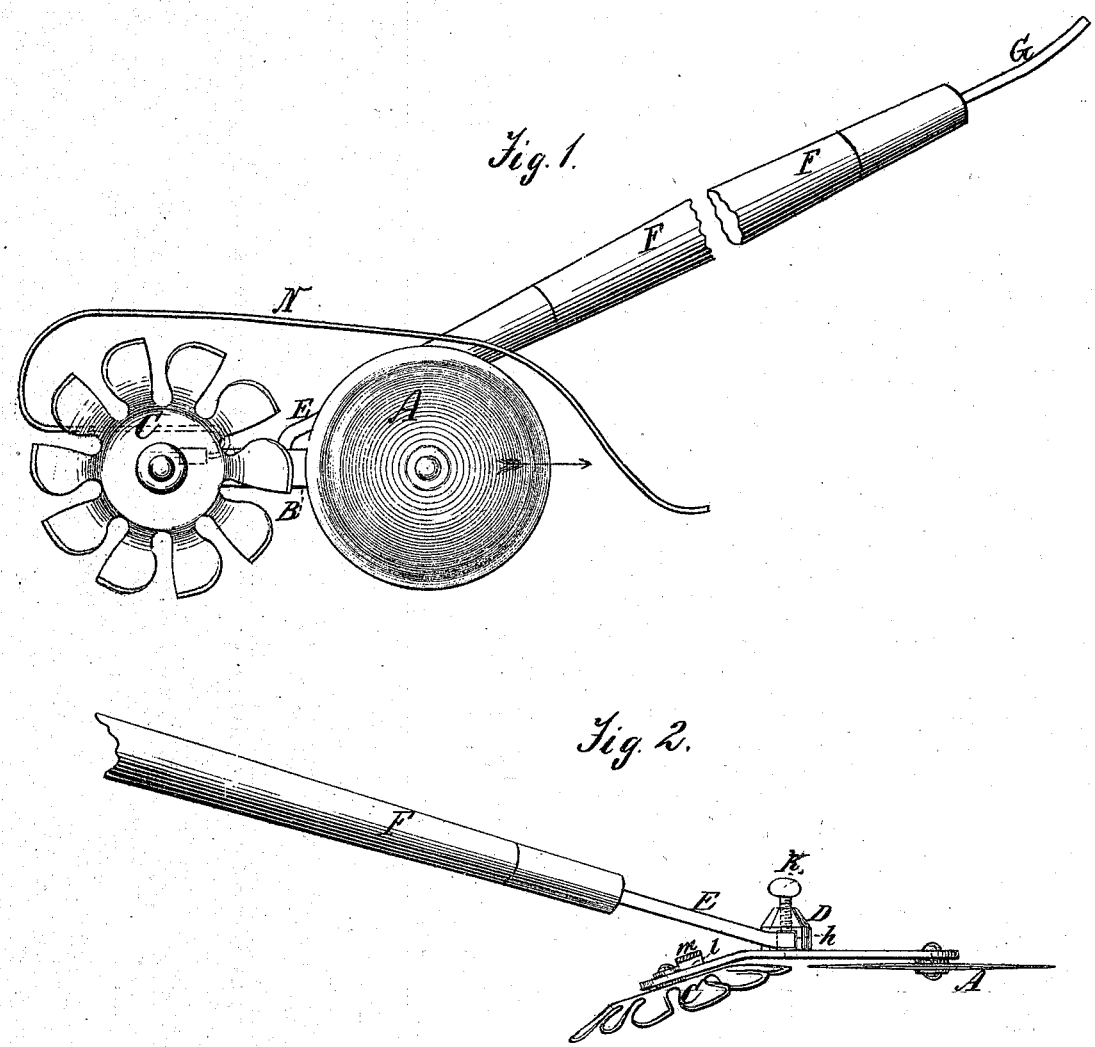

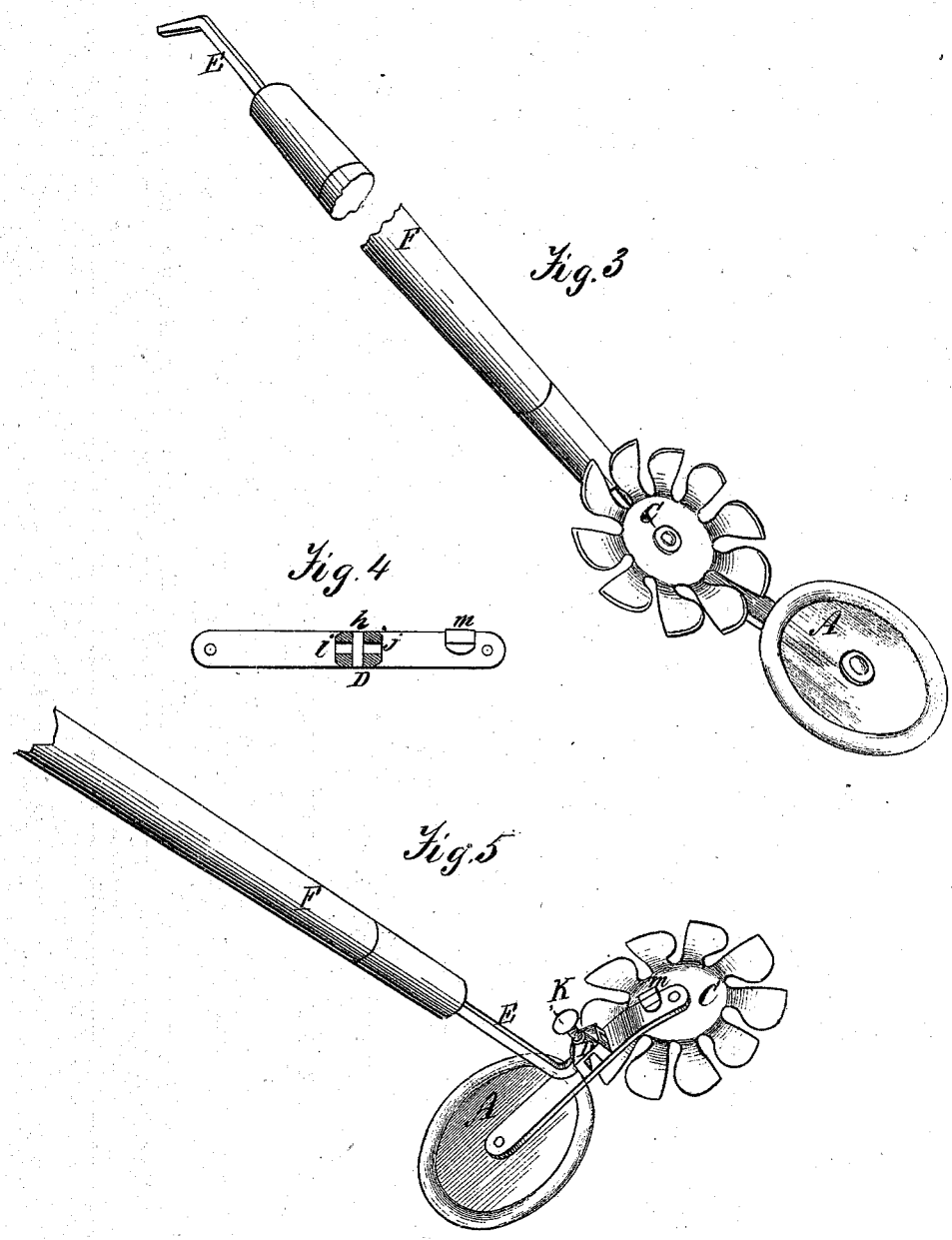

UNITED STATES PATENT OFFICE.

ERASTUS T. BUSSELL, OF INDIANAPOLIS, INDIANA.

IMPROVEMENT IN CULTIVATORS.

Specification forming part of Letters Patent No. 129,712, dated July 23, 1872; antedated June 15, 1872.

*To all whom it may concern:*

Be it known that I, ERASTUS T. BUSSELL, of Indianapolis, in the county of Marion and State of Indiana, have invented new and useful Improvements in Hand Cultivators; and I hereby declare the following to be a full, clear, and exact description of the same, reference being had to the accompanying drawing making a part of this specification, in which—

Figure 1 is a side elevation of the implement when pulled through the soil as a cultivator. Fig. 2 is a plan view of the implement when pushed through soil as a cultivator. Fig. 3 is a view in perspective of the implement when used as a spade or shovel. Fig. 4 is a side elevation of the connecting-bar, the stud provided with the sockets for the reception of the shanks on the handle being shown in section. Fig. 5 is a view in perspective of the implement when used as a hoe. Fig. 6 is a side elevation; and Fig. 7 is a plan view, partially in section, when the concavo-convex disk is used.

This invention relates to certain improvements in hand cultivators; and consists of a plain disk and a concavo-convex disk, connected by a bar having upon its outer face studs provided with sockets for the reception of a handle and a vine-guard, the whole being arranged in such a manner that the disks when pushed or drawn through the soil will revolve, the plain disk cutting and opening a way for the cutting-periphery of the concavo-convex disk, the forward concave edge of which, being in line with the direction of the plain disk, follows the latter, and displaces and mixes the soil, while the vine-guard passes under the vines in front of the plain disk, lifts them up, and carries them over both disks, where they again fall to the ground without having been injured by the operation; that, by removing the vine-guard and placing the handle in another socket, a hoe can be improvised; and that, by again changing the handle to another socket, a spade, shovel, or border-trimmer may be improvised; the object of the invention being to produce an improved hand implement of agriculture that may be used either as a cultivator, hoe, spade, or shovel, or a border-trimmer.

In the drawing, A is a plain disk, which revolves on an axis in the front end of the connecting-bar B, which is straight for a portion of its length, the balance being at an angle therewith. The concavo-convex disk C' revolves on an axis in the rear end of the connecting-bar B. The angle in the bar B commences slightly in the rear of the stud D, the vertex of the angle being on the side of the bar B, on which the stud D is placed. The stud D is a little in rear of the longitudinal center of the connecting-bar B, so that the power applied may counteract the pressure of the soil against the concavo-convex disk C' to a certain extent. The disk C, the central portion of which is flat, the arms twisted and at an angle therewith of about five degrees, may be used interchangeably with the disk C'. The amount of resistance to the pressure of the soil above mentioned is increased by bending the shank E of the handle F so that the handle will be at an angle of about five degrees, laterally, from the line of draft—*i. e.*, a straight line marked by the plain disk A. The lateral angle of the handle F causes the cultivator to be impelled, or drawn, as the case may be, in a right line, whereas, if the handle F formed a right line with the plain disk A, the concavo-convex disk C' would cause the implement to describe a circle. The angle necessary to elevate the handle F to a convenient height for work is made by a bend or crook in the shank E of the handle. The shank G, at the other end of the handle F, has an angle to correspond with the angle in the bar B. The sockets *h i j* are made in the stud D by apertures crossing each other at right angles. A thumb-screw, K, enters the stud D at the intersection of the apertures, so as to hold the shank E or G when inserted in either of the sockets *h*, *i*, or *j*. A socket, *l*, in a small stud, *m*, on the outer face of the bar B, receives the hooked end of the vine-guard N. The vine-guard N curves over and in front of the disks A and C or C', and, when the cultivator is in operation, passes under the vines in front of the disk A, lifts them up, permits the disks to pass under, and deposits the vines upon the ground without injury.

When it is designed to use the implement as a cultivator and to push it through the soil, the shank E is inserted into the socket *h*, the point of the shank turned down, and the handle F pointing to the rear of the machine at a lateral angle from the line of draft of about five degrees. To pull the implement as a cultivator, insert the shank E into the socket $h$, the point of the shank turned down, the handle F pointing to the front of the machine at about the same lateral angle as before. To use the implement as a hoe, remove the vine-guard N and insert the shank E into the socket $i$, the point of the shank being this time turned up and the plain disk A turned down to form the blade of the hoe. When designed to be used as a spade, shovel, or border-trimmer, remove the vine-guard N and insert the shank G into the socket $j$. By running the plain disk A along the border, without permitting the disk C or C', whichever may be used, to come in contact with the soil, the border can be most effectually trimmed.

Having thus described my improvements, what I claim as new and useful, and desire to secure by Letters Patent, is—

1. A plain disk A, and either a concavo-convex disk, C', or a disk, C, connected by a bar, B, provided with a stud, D, having sockets $h\ i\ j$, substantially as and for the purposes hereinbefore specified.

2. The handle F, having shanks E and G and a vine-guard, N, in combination with a plain disk, A, and either a concavo-convex disk, C', or a disk, C, connected by a bar, B, having a stud, D, provided with sockets $h\ i\ j$, as and for the purpose hereinbefore specified.

In testimony that I claim the foregoing improvement in hand cultivators, as above described, I have hereunto set my hand and seal this 25th day of October, 1871.

ERASTUS T. BUSSELL. [L. S.]

Witnesses:
   JAMES F. JOYCE,
   W. H. KERN.